United States Patent Office 3,374,265
Patented Mar. 19, 1968

3,374,265
DIPHENYL HYDROXY CARBAMATE COMPOUNDS
Charles D. Bossinger, Olympia Fields, and Kelley G. Taylor, Decatur, Ill., assignors to Armour Pharmaceutical Company, Chicago, Ill., a corporation of Delaware
No Drawing. Original application Feb. 6, 1962, Ser. No. 171,354, now Patent No. 3,278,380, dated Oct. 11, 1966. Divided and this application Feb. 18, 1966, Ser. No. 528,383
3 Claims. (Cl. 260—482)

This invention relates to new diphenyl hydroxy carbamate compounds which have the unexpected propensity when used as a central nervous system treatment for animals to obtain calming with a substantial absence of central cholinergic action. The novel compounds of this invention are characterized by having a tertiary alcohol group bonded to the same carbon atom as the phenyl groups.

This patent application is a divisional application from our copending patent application Ser. No. 171,354, filed Feb. 6, 1962, now U.S. Patent No. 3,278,380, which is in part a continuation of our copending patent application Ser. No. 23,361, filed Apr. 20, 1960, now abandoned. The subject matter of the present application is also disclosed in our copending application Ser. No. 729,554, filed Apr. 21, 1958, now abandoned, which was a continuation-in-part of our abandoned patent application Ser. No. 554,132, filed Dec. 20, 1955.

It is a principal object of this invention to provide compounds which when employed in the treatment of the central nervous system of an animal, obtain a calming effect while central cholinergic action is substantially eliminated.

Another object is to provide compounds for use in improved central nervous system treatment which, when so used, will obtain a calming effect with minimal undesirable side effects.

A further object is to provide new and improved compounds which are economical to produce and easily controlled.

Still further objects and advantages of this invention as shall here appear are readily fulfilled by the present invention in an unexpected fashion as can be readily discerned from the following detailed description of exemplary embodiments of this invention.

Our improved compounds for improved central nervous system treatment of animals, i.e., mammals and fowls, especially man and domestic animals, have the formula

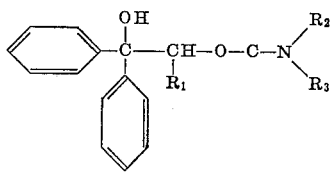

wherein $R_1$ is hydrogen, methyl or ethyl, and $R_2$ and $R_3$ are hydrogen, methyl, or ethyl. Specific preferred compounds of this class are: 2-hydroxy-2, 2-diphenylethyl carbamate, N,N-dimethyl-2, 2-diphenyl - 2 - hydroxyethyl carbamate, 1,1-diphenyl-1-hydroxy-2-propyl carbamate, and 1,1,diphenyl-1-hydroxy-2-butyl carbamate.

In using the compounds of the present invention for central nervous system treatment, the special aromatic carbamates may be administered to the mammal, especially a human being, orally, as well as parenterally, e.g., by intravenous, subcutaneous or intraperitonal injection. These compounds are well absorbed orally, and consequently this mode of administration is to be preferred. The administration of such compounds orally may be obtained as a powder, tablet, capsule, solution or suspension. The dosage at which desirable central nervous system treatment is obtained will, of course, vary with the individual compounds and with the species and physiology of the individual to which it is adminstered. Generally, however, the oral dosage for humans will range from 300 to 1600 mg. per day. A typical dosage would be 800 mg. per day given orally.

The aromatic carbamates of this invention are preferably prepared by reacting an appropriate organic cyclic carbonate, such as, 1,1-diphenylethylene carbonate with an ammonium-containing reagent such, for example, as ammonium hydroxide, dimethylamine, liquid ammonia and the like.

To achieve a fuller understanding of the preparation of these compounds, and not by way of limitation, the following examples are presented.

Example I

The following method was utilized in the preparation of 2-hydroxy-2,2-diphenylethyl carbamate:

1,1-diphenylethylene carbonate, in the amount of 10 gms., was mixed with 200 ml. of a concentrated aqueous ammonium hydroxide solution. The resulting mixture was heated for a period of 1 hour on a steam bath. The solvent was separated from the reaction product under reduced pressure, and the separated reaction product was crystallized from chloroform. The crystallized reaction product, which was obtained in a yield of 5.9 gms., had a melting point of 169–170° C.

Example II

The following method was utilized in the preparation of N,N-dimethyl-2,2-diphenyl-2-hydroxyethyl carbamate:

1,1-diphenylethylene carbonate, in the amount of 5 gms., was mixed with 100 ml. of an aqueous 40% dimethylamine solution. The resulting mixture was heated on a steam bath for a period of 1 hour. The reaction mixture was then cooled, and the reaction product separated from residual liquid by filtration. The separation reaction product was obtained in a yield of 5.6 gms. This product was crystallized from chloroform to provide a substance having a melting point of 127–129° C.

Example III

The following method was utilized in the preparation of N,N-dimethyl-2,2-diphenyl-2-hydroxyethyl carbamate:

A solution of 32 gms. of phosgene in 200 ml. of benzene was added, drop-wise, to a stirred solution of 69 gms. of 1,1-diphenyl-1,2-ethanediol in 600 ml. of benzene. These solutions were maintained at a temperature of 30° C. during the addition step.

The resulting reaction mixture was stirred for a period of 45 minutes, and then 48 gms. of diethylaniline in 100 ml. of benzene was added thereto while maintaining such mixture at a temperature of less than 40° C. This mixture was then stirred for an additional 2½ hours. Thereafter, about 500 ml. of ice water was added to the flask, and the benzene layer thereupon formed was separated from the aqueous layer and washed with an additional 500 ml. of ice water.

To the washed benzene solution was added 500 ml. of an aqueous 40% dimethylamine solution, while maintaining the solutions at a temperature of less than 10° C. The resulting mixture was warmed overnight to room temperature, whereupon no solid was formed in the flask.

The two layers of solution in the flask were separated, and the benzene layer was concentrated under reduced pressure. The reaction product was obtained as a white solid, and recrystallized from chloroform. This crystallized product, which was obtained in a yield of 77 gms., had a melting point of 128–129° C.

3

The diethylaniline reactant utilized in this process is a base acceptor. Other tertiary amines, such as triethylamine, can be utilized to remove hydrochloric acid from the reaction mixture.

Example IV

The following method was utilized in the preparation of 1,1-diphenyl-1-hydroxy-2-propyl carbamate:

1,1 diphenyl 1,2-propandiol, in the amount of 22.8 gms. (0.1 mole), in 200 ml. of ether was introduced into a 500 ml. round-bottom flask fitted with a mechanical stirrer, drying tube and dropping funnel. To this ether solution was added 8.5 ml. of pyridine, and thereafter the flask was cooled in an ice bath. Then, phenyl chlorocarbonate in the amount of 15.6 gms. (0.1 mole), in 50 ml. of ether was dropped into the flask, slowly, through the dropping funnel. After addition of the phenyl chlorocarbonate was completed, stirring of the resulting mixture was continued for a period of one hour at room temperature. Then, 10 ml. of ice water was introduced, drop-wise, into the flask. Thereafter, the resulting phases were separated; the separated ether solution was washed with 25 ml. of ice water, three times, and then dried over anhydrous magnesium sulfate.

After the ether had been stripped off, the residue was introduced into liquid ammonia, and the resulting mixture was refluxed for a period of three hours. After the ammonia had evaporated, the residue was recrystallized from benzene. The recrystallized material was obtained in the amount of 10 gms. and demonstrated a melting point of 179–181° F. This material was subjected to analysis, and the following results were obtained.

Calculated: C, 70.83%; H, 6.32%; N, 5.16%. Analyzed: C, 70.36%, 70.60%; H, 6.33%, 6.29%; N. 4.72%, 4.91%.

Example V

The following method was utilized to prepare 1,1-diphenyl-1-hydroxy-2-butyl carbamate:

1,1-diphenyl-1,2-butanediol 36.3 g. (0.15 mole), diethyl carbonate 24.2 ml. (0.2 mole) and potassium carbonate 0.1 g. were mixed in a round-bottomed flask fitted with a distilling head. The reaction mixture was heated with an oil bath at approximately 150° C. The ethanol which was formed during the reaction was distilled. After the theoretical amount of ethanol was removed, the diethyl carbonate, if any, was distilled under reduced pressure.

The residue, partially dissolved in 250 ml. of MeOH was poured into 500 ml. of MeOH saturated with $NH_3$.

The reaction mixture was left standing at room temperature over the weekend.

The yellow solution was filtered free of any insoluble material. The filtrate was evaporated under reduced pressure to give a yellow solid. The color was washed off with cyclohexane and the residue was recrystallized twice from benzene to give white fluffy crystals 23.6 g. M.P. 185–187°.

Calculated: C, 71.55%; H, 6.71%; N, 4.91%. Analyzed: C, 71.30%, 71.59%; H, 6.76%, 6.78%; N, 4.79%, 5.01%.

While in the foregoing specification various embodiments of this invention have been set forth and specific details thereof elaborated for the purpose of illustration, it will be apparent to those skilled in the art that the invention is susceptible to other embodiments and that many of these details may be varied widely without departing from the basic concept and spirit of the invention.

What is claimed and desired to secure by Letters Patent is:

1. Diphenyl hydroxy carbamates having the formula

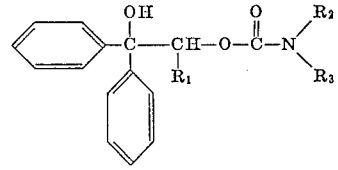

wherein $R_1$ is hydrogen and $R_2$ and $R_3$ are selected from the class consisting of hydrogen, methyl and ethyl.

2. A compound according to claim 1 denominated 2-hydroxy-2,2-diphenylethyl carbamate.

3. A compound according to claim 1 denominated N,N-dimethyl-2,2-diphenyl-2-hydroxyethyl carbamate.

References Cited

UNITED STATES PATENTS

| | | | |
|---|---|---|---|
| 2,656,378 | 10/1953 | Berger | 260—482 |
| 2,967,880 | 1/1961 | Finke et al. | 260—482 |
| 3,066,164 | 11/1962 | Sifferd et al. | 260—482 |

OTHER REFERENCES

Berger: J. Pharm. Exp. Ther., vol. 104 (1952), pp. 229–33.

LORRAINE A. WEINBERGER, *Primary Examiner.*

A. P. HALLUIN, *Assistant Examiner.*